United States Patent [19]

Weinberger et al.

[11] Patent Number: 5,084,875
[45] Date of Patent: Jan. 28, 1992

[54] SYSTEM FOR AUTOMATICALLY MONITORING COPIERS FROM A REMOTE LOCATION

[75] Inventors: Joseph Weinberger, 13 Buernset La., East Brunswick, N.J.; Gary Bricault; James Laird, both of Rochester, N.Y.

[73] Assignee: Joseph Weinberger, East Brunswick, N.J.

[21] Appl. No.: 450,605

[22] Filed: Dec. 13, 1989

[51] Int. Cl.$^5$ .............................................. G06F 11/00
[52] U.S. Cl. ........................................ 371/291; 371/16.4;
355/205; 364/264; 364/DIG. 1; 395/575
[58] Field of Search ......................... 371/29.1, 16.4;
355/205, 206, 207; 340/825.06, 825.54; 364/132

[56] References Cited

U.S. PATENT DOCUMENTS

| | | | |
|---|---|---|---|
| 3,623,013 | 11/1971 | Perkins et al. | 340/172.5 |
| 4,311,986 | 1/1982 | Yee | 340/825.63 |
| 4,545,013 | 10/1985 | Lyon et al. | 364/200 |
| 4,633,412 | 12/1986 | Ebert, Jr. et al. | 364/492 |
| 4,652,698 | 3/1987 | Hale et al. | 380/24 |
| 4,712,213 | 12/1987 | Warwick et al. | 371/15 |
| 4,947,397 | 8/1990 | Sobel et al. | 371/16.4 |
| 4,962,368 | 10/1990 | Dobrzanski et al. | 340/514 |

OTHER PUBLICATIONS

Xerox 1090 Copier Electronic Data Interface Operator Guide and Installation Instructions, Nov. 1988.
Rochester Democrat and Chronicle, by David Lindley, Mar. 28, 1990.
Kodak Ektaprint brochure, Copyright, Eastman Kodak Company 1986.

*Primary Examiner*—Jerry Smith
*Assistant Examiner*—Ly V. Hua
*Attorney, Agent, or Firm*—Hedman, Gibson & Costigan

[57] ABSTRACT

A system for automatically, remotely monitoring the operational status of one or more copy machines each having a copier computer therein for determining copier status comprising a data tap in the copier to monitor status information from the copier computer, a translator to adapt the status information from the copier computer into uniform information for transmission to the remote location, and a transmission link between the individual copiers and the remote location. The system utilizes a scanner to respectively monitor the copiers which can poll each of the copiers at a uniform rate or, when requested by the user at the central location, vary the poll rate of one or more of the copiers to poll the selected copier with increased regularity, slowing the polling rate of the other copiers, to provide a real-time monitoring of the selected copier. The system also provides for the operation of the copier from the remote location to allow the user at the remote location to operate the copier, i.e., for the diagnosis of a detected problem.

9 Claims, 16 Drawing Sheets

SYSTEM FOR AUTOMATICALLY MONITORING COPIERS FROM A REMOTE LOCATION

FIELD OF THE INVENTION

The present invention relates to a system for remotely monitoring the status of a plurality of copiers from a central location.

BACKGROUND OF THE INVENTION

Several methods for reporting copy machine status are known in the art. The simplest is a series of indicators arranged remotely as a "scoreboard" to show the status of each copier in a limited fashion. This approach, however, is only able to indicate gross failures and is not a practical monitoring system when there are a large number of copiers distributed over a large area or on multiple floors of a building.

A technique for remotely monitoring a number of copiers is the XEROX REMOTE INTERACTIVE COMMUNICATIONS (RIC) system which interfaces with several different XEROX copiers (such as the 1090) and relays status information over telephone lines to a central service office. The RIC has been designed primarily to collect billing information. In addition, it also collects ongoing failure information that it locally analyzes for failure trends, i.e., a sudden increase in jams in the fuser section. If a failure trend is recognized, the RIC will report its failure analysis to the service office. The RIC adapter consists of a dedicated microprocessor controller that plugs into a special data port at the copier and an auto-dial modem for direct hookup to a telephone line.

The RIC system has the disadvantage in that it is designed to interface with only a limited subset of XEROX copiers and that it only reports to the service office once a day. In addition, the data transfer from the copier to the RIC adapter must be manually initiated from the copier control panel by an operator in order for the RIC unit to be properly updated prior to its call out sequence.

It is, therefore, an object of the present invention to provide a method of linking a plurality of copiers, through hardware and software, in such a way so as to provide continuous, automatic monitoring of copier status, including error conditions, from a central location.

It is a further object of the present invention to monitor various types of copiers, i.e., static and dynamic, with a single system.

SUMMARY OF THE INVENTION

The present invention relates to a system for automatically, remotely monitoring the status of one or more copier machines, each copier machine having a copier control computer for determining status which communicates with a status display on said copier along a data line, from a remote location comprising a translator associated with each copier, means for providing a physical interface between the data line of the respective copier and the translator, means for communication between the translator of each copier and a status scanner located at the remote location, which polls each of the translators to obtain status information therefrom, and a central computer located at said remote location communicating with said scanner to poll assemble and format the status information.

BRIEF DESCRIPTION OF THE DRAWINGS

The following drawings, in which like reference characters indicate like parts, are illustrative of embodiments of the invention and are not intended to limit to scope of the invention on any manner as encompassed by the claims forming a part hereof.

DESCRIPTION OF THE PREFERRED EMBODIMENT

Figure 1:
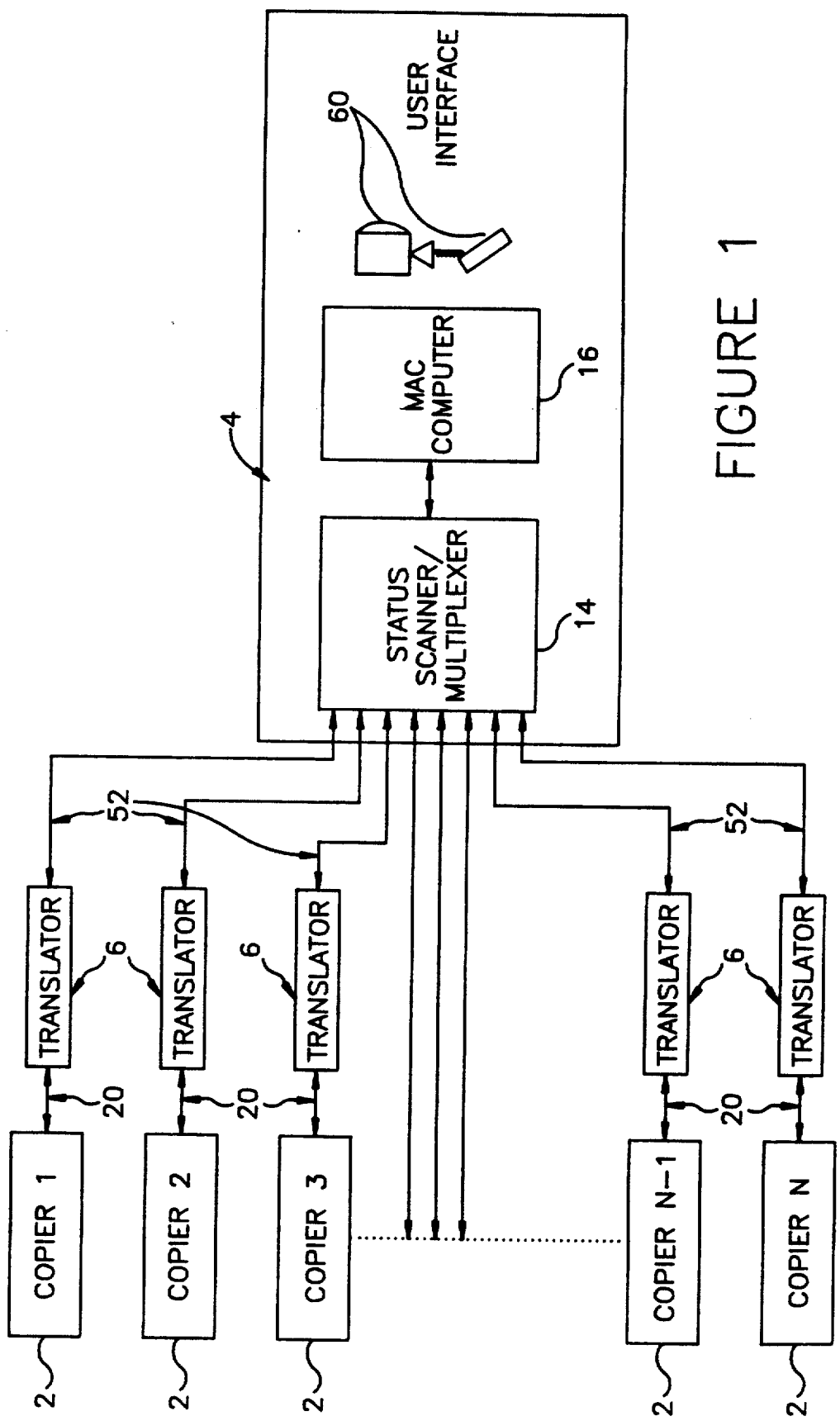
FIG. 1 is a schematic block diagram of the system of the present invention.

With reference to the drawings, and particularly FIG. 1, the present copier monitoring system is capable of automatically monitoring, collecting and storing copier profiles, service records and diagnostics from a plurality of copier machines 2 at various locations from a central location or data collection point 4. To accommodate for the differences between various copier models of both like and different manufacturers, a translator 6 is used to provide a uniform interface between the copier and the central data collection point 4. The translator 6 is located at the copier site and communicates with the copier 2 through the use of a data tap 8 (see FIGS. 2 and 3) which monitors the error signal transmitted from the copier control computer 10 to the copier status display 12 along a data ribbon cable 18.

The copier status is transmitted through the translator 6 to a scanner/multiplexer 14 at the central location 4, including a data collection computer 16, along a communication means shown as line 52. At the central location 4 the data is messaged and stored in a database.

The present system, therefore, links remote copiers to a central data collection point 4 through the use of, generally, a data tap 8 and translator 6 associated with the copier 2 on the customer premises and connected by conventional communication means 52 to a scanner/- multiplexer component 14 and status copier data collection component 16 at the central location 4.

Machine status monitoring in a copier is an output function. Therefore, there are various output interfaces depending on the model and manufacturer of the copier. However, these output interfaces can generally be classified as "static" and "dynamic".

Figure 2:
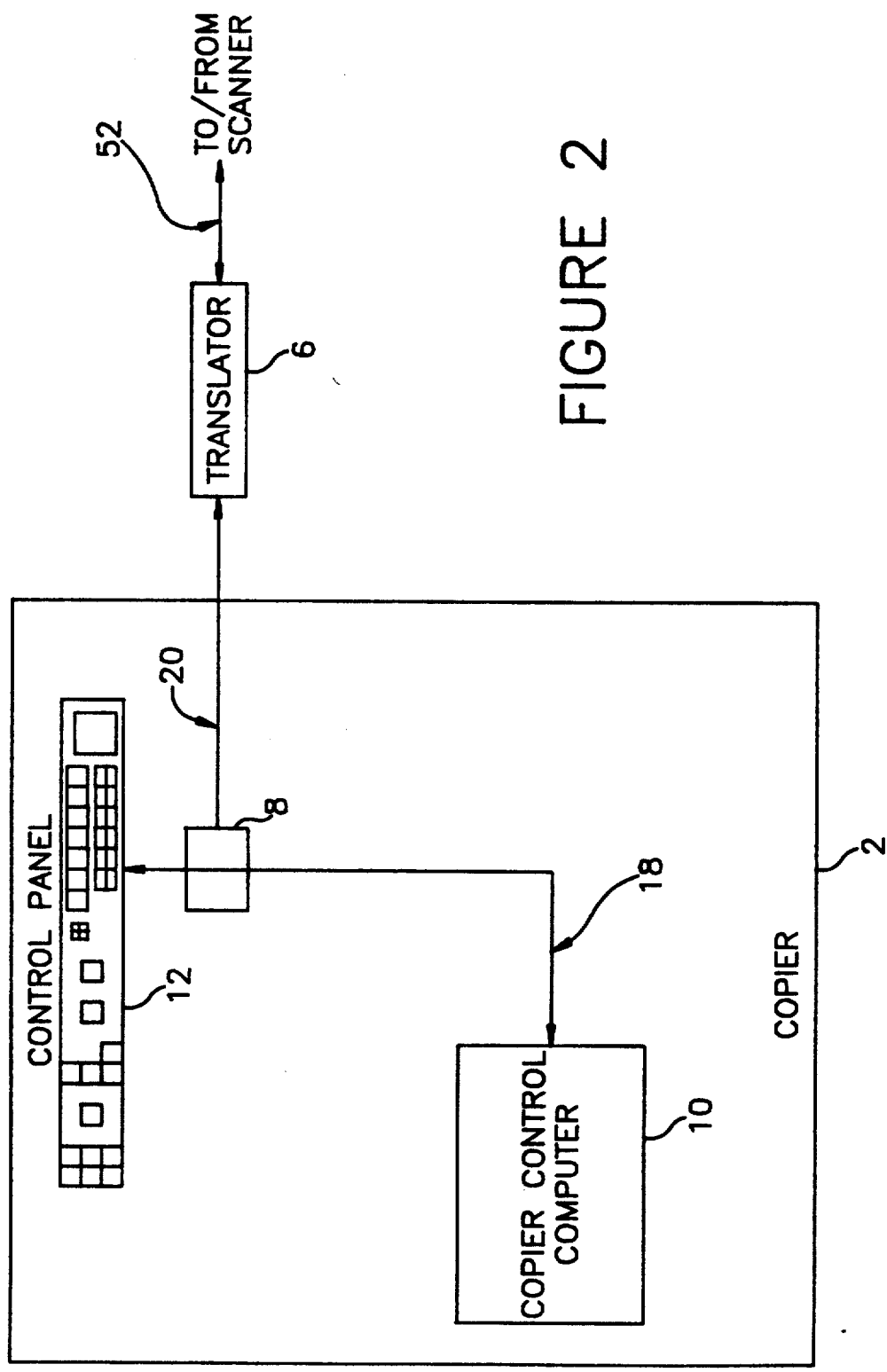
FIG. 2 is a schematic block diagram of a static copier interface and data tap for use with the present system.

The static type, as shown in FIG. 2, utilizes illuminating indicators, such as light emitting diodes ("LED's"), on a status display 12 to indicate setup and operational status by either back-lighting a transparency or as an indicator adjacent to a label. Using this method the copier control computer 10 directly controls the status indicators by turning them on or off as needed. In certain cases, fault conditions of the copier are indicated by error codes that can be, for example, displayed through the copy counter as a two digit code number. An example of this class of copier is the XEROX model 1025.

Figure 3:
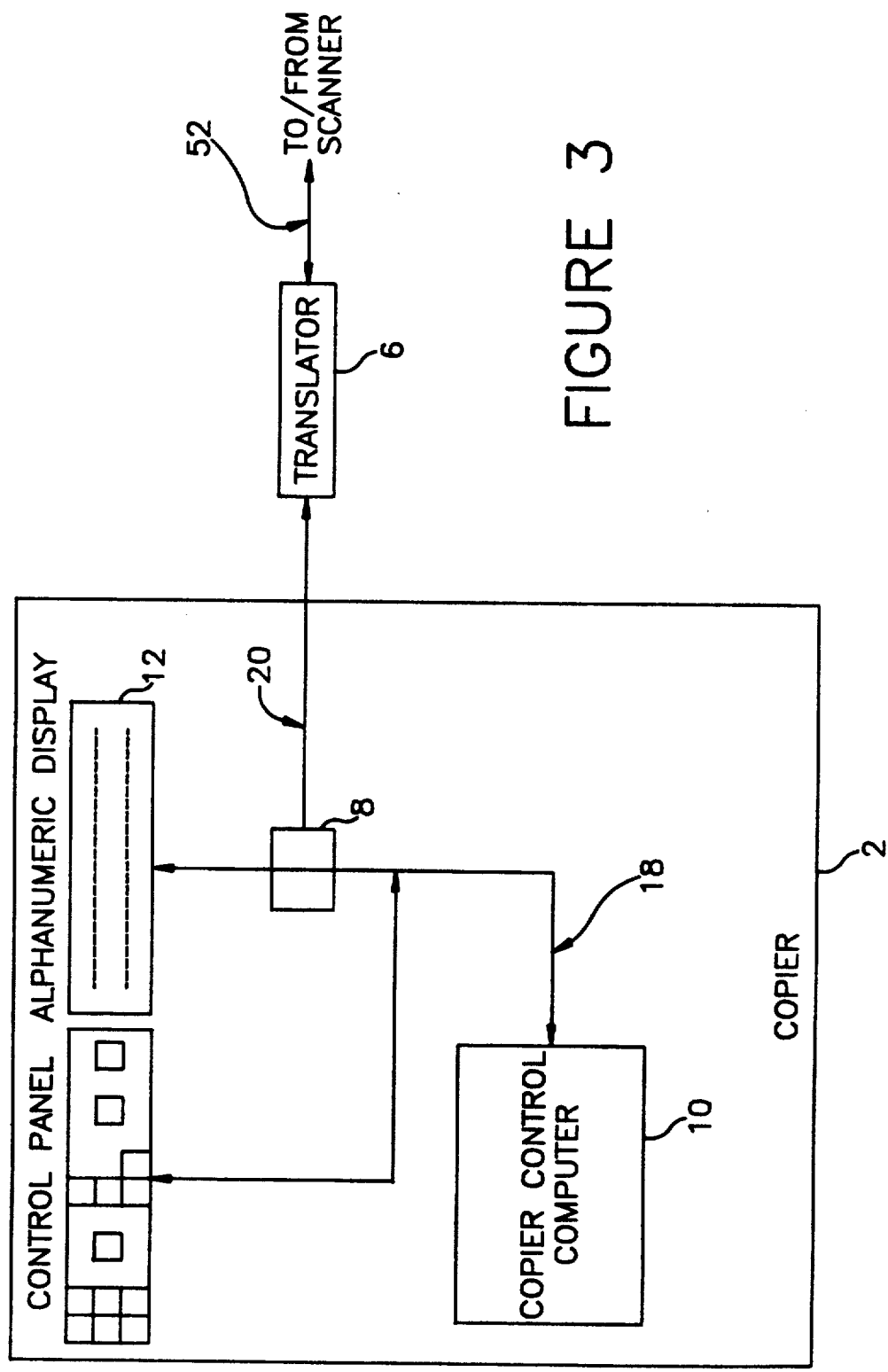
FIG. 3 is a schematic block diagram of a dynamic copier interface and data tap for use with the present system.

The dynamic output type, shown in FIG. 3, utilizes not only illuminating indicators as before, but also some form of alphanumeric display device that can be altered to represent setup and status information in plain linguistic alphanumeric text. This device could be a single or multiple line display utilizing technology such as a vacuum fluorescent, liquid crystal or light emitting diodes, or even CRT video displays. In these dynamic copiers the copier control computer 10 passes information over a data cable 18 to the display device's controller which in turn converts the raw data into a formatted display image on the display 12. This information stream may be in either a serial or parallel manner. An example of this class of copier is the XEROX model 1040.

To extract the copier status information that is displayed on the copier display 12 a data tap 8 will be installed within the copier. The data tap 8 will be placed in line with the data transmission cable 20 between the copier control computer 10 and the control panel/display device 12. The purpose of the data tap 8 is to provide a physical interface means to the translator 6 for a variety of copiers. The translator 6 also isolates the data transmission cable 20 from any additional loading or noise from outside the copier 2.

Because the data tap 8 is located inside of the copier 2 it must not violate any FCC regulation. As a result, the datatap 8 is a simple device that merely passes the status information from the copier 2 to the translator 6, i.e., by a Y-cable or buffer/driver device.

In the case of the static display method it may be desirable only to monitor a portion of the status devices because not all of the status devices indicate fault conditions. There are also difficulties interfacing with the static display because of the variety of the characteristics of different status devices and circuit operating voltages that exist in the various models of different or like manufacturers.

Furthermore, the status indicators are usually time multiplexed to reduce power consumption and the overall number of connections between the copier controller 10 and the control panel 12. This precludes simple monitoring of a voltage drop across a status device and requires the latching of the data at the time that a status device may be switched on.

Figure 4A:
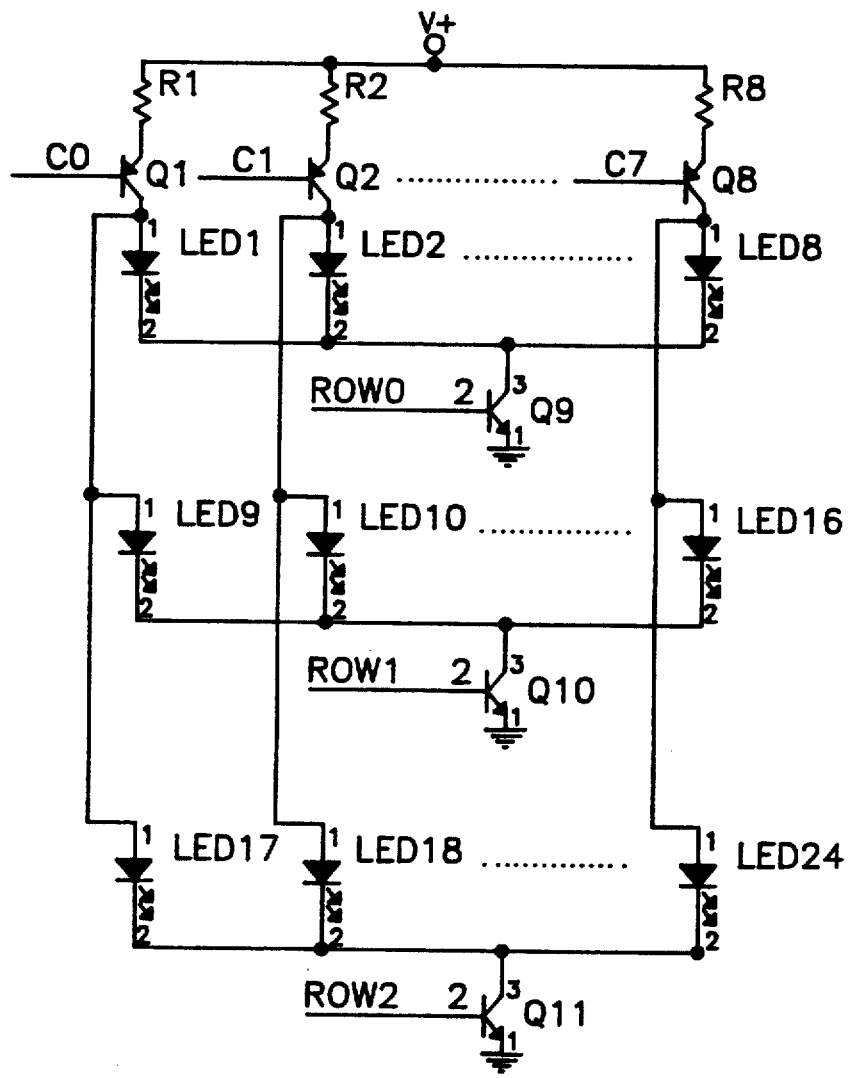
FIG. 4 is a schematic diagram of multiplexed indicators and data tap scheme for use with the present system.
FIG. 4B is a multiplexer timing diagram.
FIG. 4C is a schematic diagram of the data tap between the copier transmission lines and the translator.
Figure 4B:
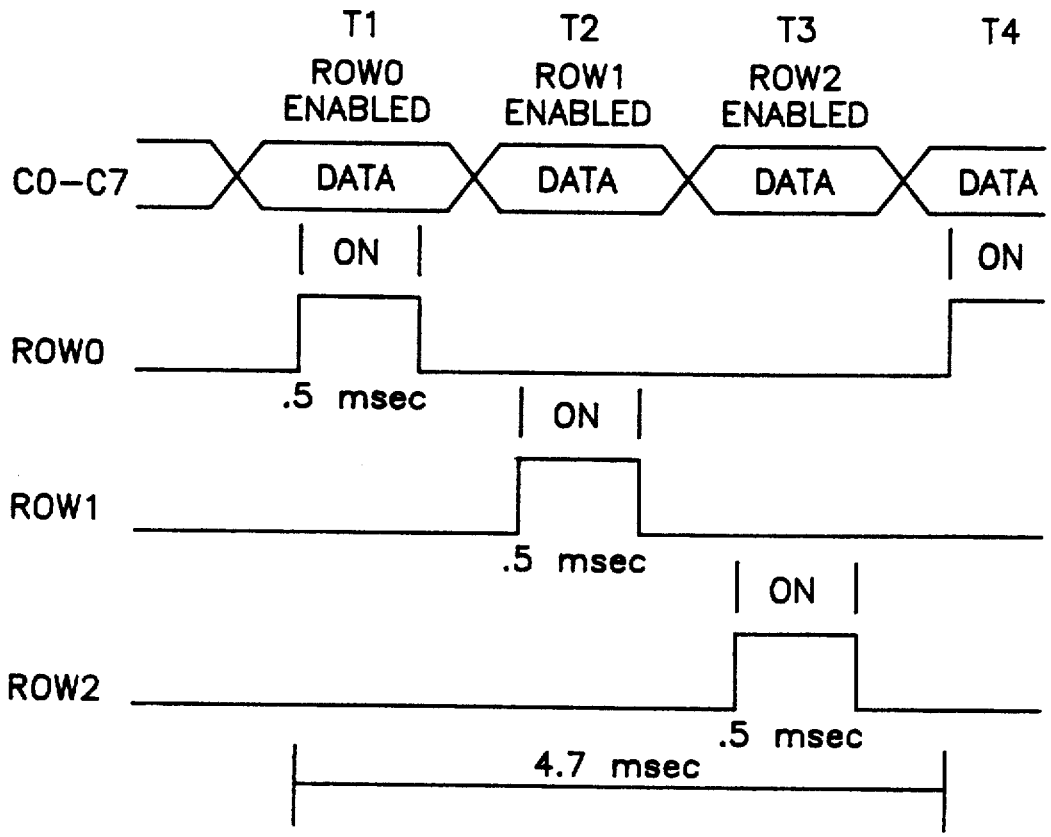
Figure 4C:
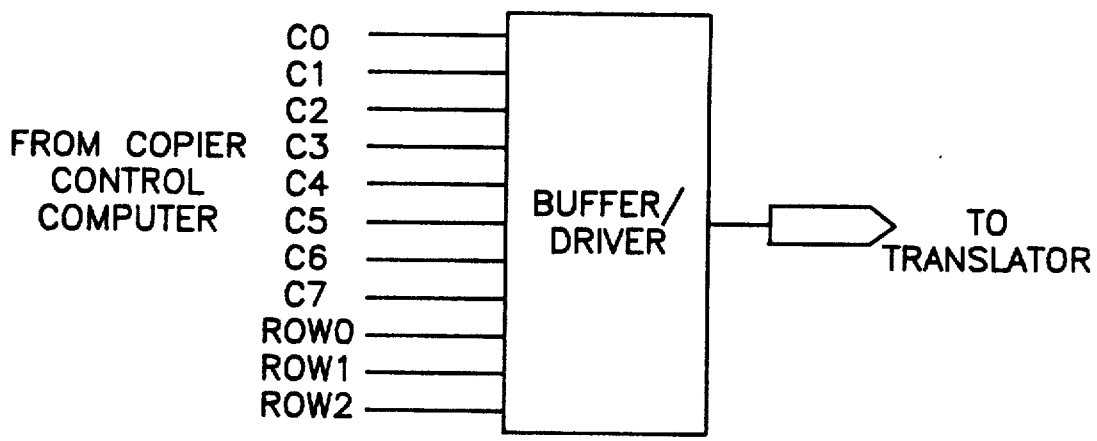

An example of a multiplexed display system can be seen in FIGS. 4A, 4B and 4C. Twenty-four (24) LED's, LED 1-LED 24, are organized into a three row by eight column matrix. As demonstrated in the multiplexer timing diagram, each row of eight LED's is selected through a common switching transistor, Q 9-Q 11 respectively, by applying a drive pulse to the base, terminal two of the device. The individual LED's within a common row are selected in parallel by applying a drive signal to the base of the column driver transistor Q 1-Q 8 respectively. In order to turn on LED 10, it is necessary to apply drive signals to Q 2 at the time Q 10 is driven [C 1×ROW 1] at time T 2. To capture the data column pattern for each row, it will be necessary that the C 0-C 7 and ROW 0-ROW 2 signals pass through from the data tap 8 to the translator 6 for processing.

Figure 5:
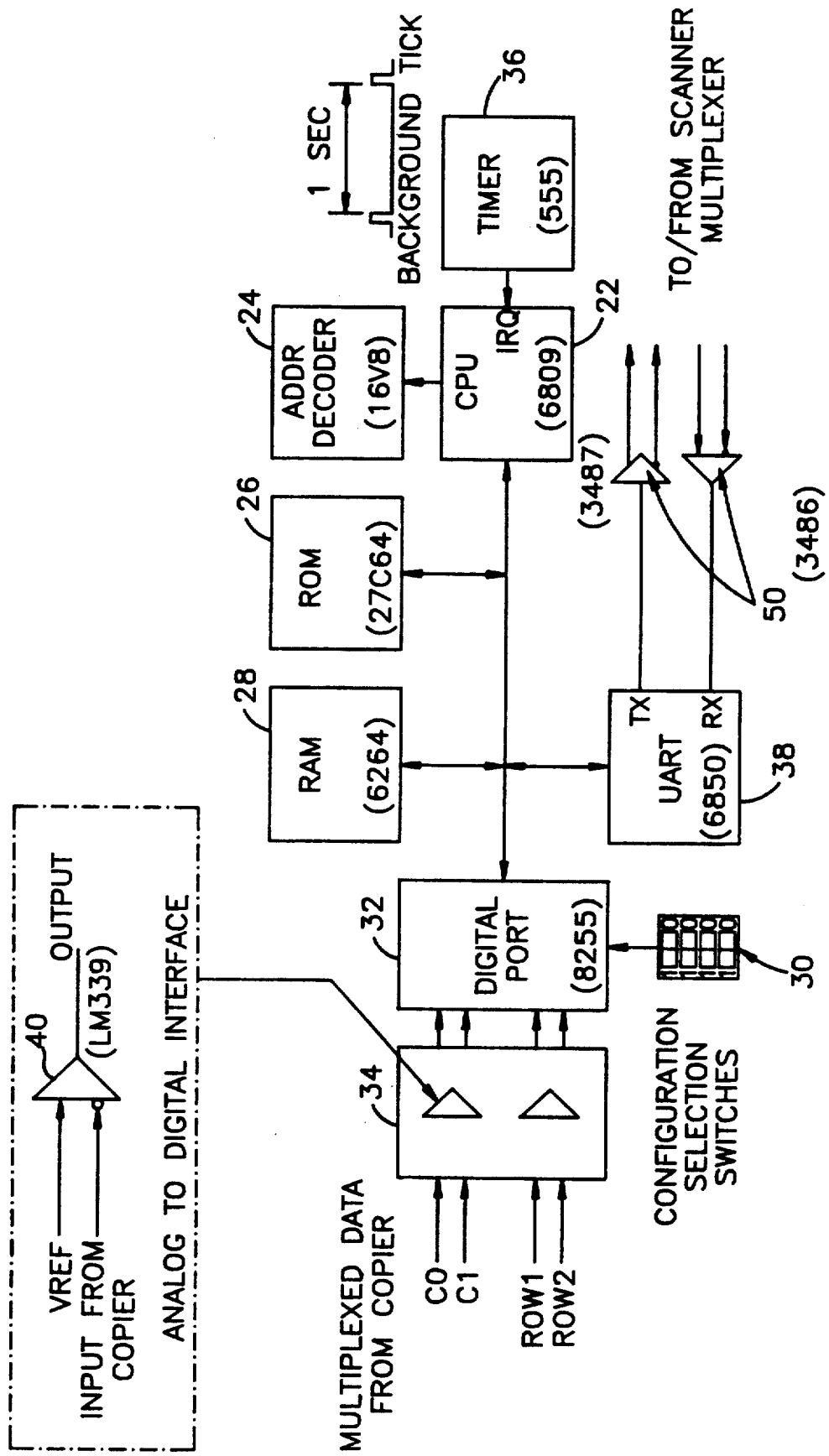
FIG. 5 is a schematic block diagram of a multiplexed data version, translator for use with the present invention.

The translator design for a static multiplexed data interface is displayed in FIG. 5 It is microprocessor based using standard off-the-self components as well as basic design techniques. A 6809 microprocessor chip is the central processing unit 22 (CPU) along with a programmable address decoder 24 (16V8) used to select the support devices (i.e., RAM, ROM etc.) that are address mapped to the CPU 22.

The stored program for the CPU 22 can be found in the read only memory 26 (ROM, 27C64). The CPU stack information and temporary variables are located in random access memory 28 (RAM, 6264).

The translator 6 is also comprised of configuration selection switches 30, a digital port 32 (8255), analog to digital interfaces 34 (LM339), a timer 36 (555) and a universal asynchronous receiver/transmitter 38 (UART, 6850).

The set of configuration selection switches 30 enables the translator 6 to take on different functional characteristics based on the setting of the switches 30. The outputs of the switches 30 are read by the CPU 22 through a digital port 32. This device consists of three 8-bit parallel ports that would be configured as to allow the CPU 22 to read in the digital level signals from the digital port 32. The state of the switches 30 are read in at power-up time by the CPU 22 to set up certain operating characteristics of the translator 6.

Some examples of this would be to map stored error coded in ROM 26 to different data input line combinations for specific copiers. Switch settings into other inputs of the digital port 32 could configure other operating parameters of the translator 6 for similar copiers Minor differences between copiers that could be compensated for might include error messages unique to one or more specific copiers or the size of storage space allocated in RAM 28 for message lengths The CPU 22 receives the status data from the digital port 32. However, the data that comes from the data tap 8 to the digital port 32 is multiplexed data and the information may not be at appropriate signal levels for the digital port 32 or may contain undesirable signal noise and, therefore, must be conditioned to digital levels through an analog to digital interface 34. This interface 34 consists of a LM339 voltage comparator 40 with two inputs, the signal to be conditioned from the copier 2 and a threshold reference voltage (VREF).

The output of the comparator 40, OV for a logical "0" state or +5 V for a logical "1" state, will reflect the differential relation of the voltage input from the copier 2 and VREF. That is to say, if the input is greater than the reference the output will be OV and visa versa.

Now that the input signal has been conditioned to the correct signal levels for the digital port 32, the signal can be read by the CPU 22 through the lines of the digital port 32. This information would then be transferred to the RAM 28 for later evaluation, based on the characteristics from the configuration switches 30.

The status information of the copier changes at a relatively slow pace compared to the computational speed of a microprocessor based system. Therefore, it is only necessary for the translator 6 to periodically evaluate the condition of the copier 2. To accomplish this periodic acquisition technique, a method known as "interrupt driven" is used.

Normally, the CPU 22 would be executing its program waiting in an idle loop. The timer 36, also known as a background timer, produces a signal at some interval, for example 1 second, into the interrupt request (IRQ) input of the CPU 22. This interrupt causes the CPU 22 to execute an algorithm to input and store the data present from the three row by eight column matrix. After the row LED is enabled, the column LEDs are stable, the data is stored and then the next row of data is displayed. Later the CPU 22 can further evaluate the information to determine what status conditions exist.

The algorithm for such a scan might conceptually look as follows after the background timer 36 has pulsed the IRQ input (all signal references are from FIG. 4, multiplexer time diagram):

1. The CPU 22 polls the digital port input mapped to ROW 0 and waits for it to be asserted at T 1.
2. At that time it is known that the data on C 0–C 7 is valid and they are stored in a known location in RAM 28.
3. The CPU 22 now repeats steps 1 and 2, instead polling for ROW 1 and ROW 2 to be asserted at T 2 and T 3, respectively.
4. Once all of the information has been acquired, the stored images are sifted and compared against error tables that are stored in the ROM 26. The outcome of the tests are stored in RAM 28 for later use.
5. The CPU 22 then returns to its wait loop for the next timer interrupt.

The CPU 22 may also receive an interrupt request signal from the UART 38. The UART 38 enables the CPU 22 to communicate with the scanner/multiplexer 14. The UART 38 performs the task of converting the serial data that is transmitted from the scanner 14 into 8-bit bytes that the CPU 22 can process. It also converts the 8-bit bytes of data from the CPU 22 into a serial stream to be sent back to the scanner 14 along line 52 Furthermore, the transmit (TX) and receive (RX) signal lines are converted to/from standard RS-422 line drivers/receivers 50 for transmission of data over long distances with high immunity from external noise sources. Various transmission media, such as fiber optics, telephone lines, etc., are also possible.

When a service request command from the central data collection point 4 is received by the translator 6, the CPU 22 executes an algorithm to retrieve the most recent condition evaluation in RAM 28. The report could be as simple as an encoded token that represents the meaning of the most recent evaluation. This token would then be decoded into the status text string by the scanner 14 or the user computer 16. Alternatively, the transmitted data could be the literal text string of the status message as it would be shown on the copier control panel 12.

With regard to dynamic display systems, there are two types of data transmission methods usually used to pass control and text information to a display 12. These types are classified as "serial" and "parallel".

Figures 6A, 6B:
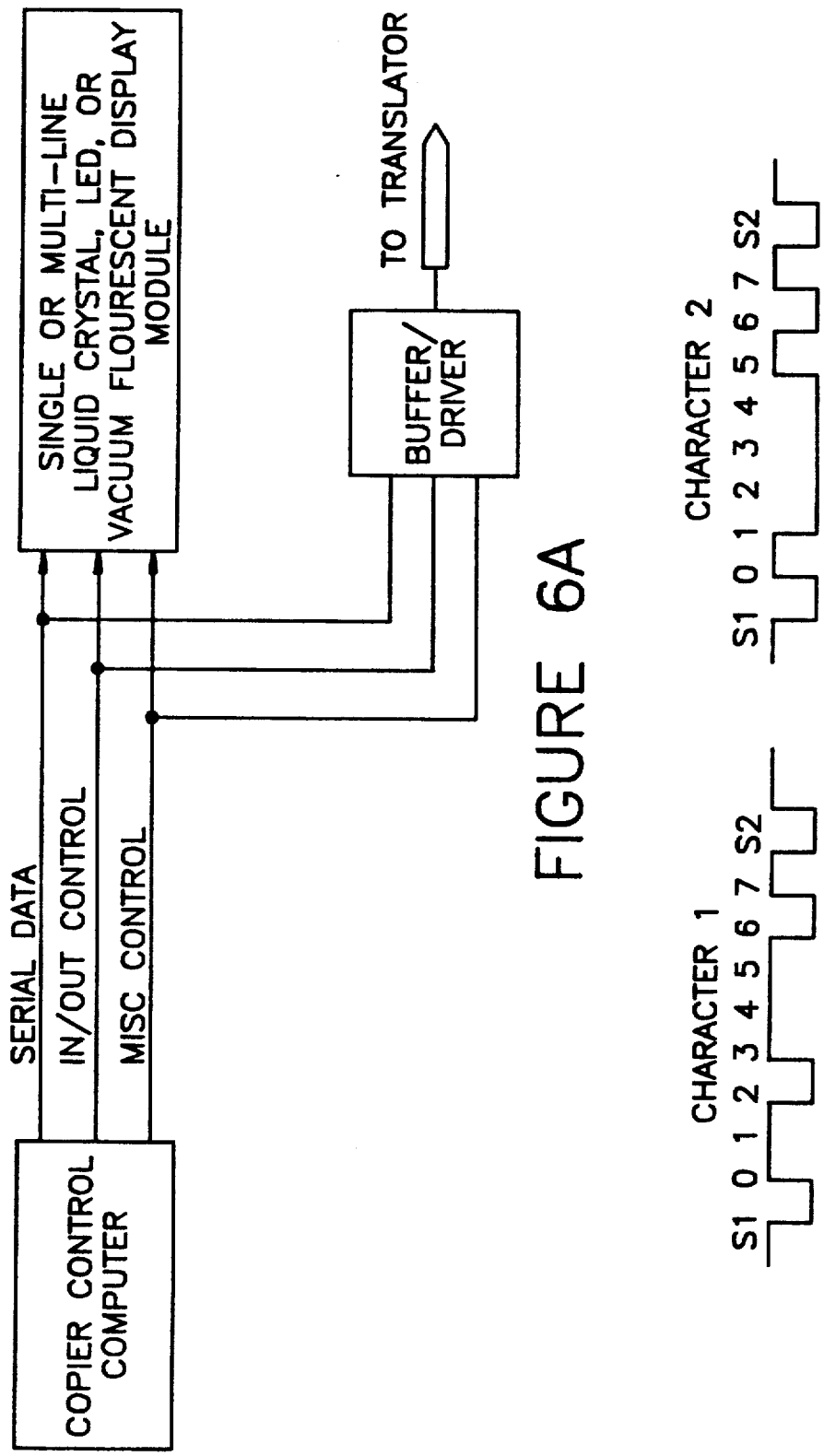
FIG. 6A is a schematic block diagram of a serial data transmission technique from a copier control computer, to the control panel display.
FIG. 6B is a serial data transmission representation.

With serial transmission, shown in FIGS. 6A and 6B, information is passed from the copier control computer 10 to the target display 12 in a stream, bit-by-bit, at a specific data rate (bit rate). Each 8-bit byte is proceeded by a start bit, i.e., S1, and terminated by a stop bit, i.e., S2 to allow the receiving device to synchronize and receive the incoming data.

Figure 7A:
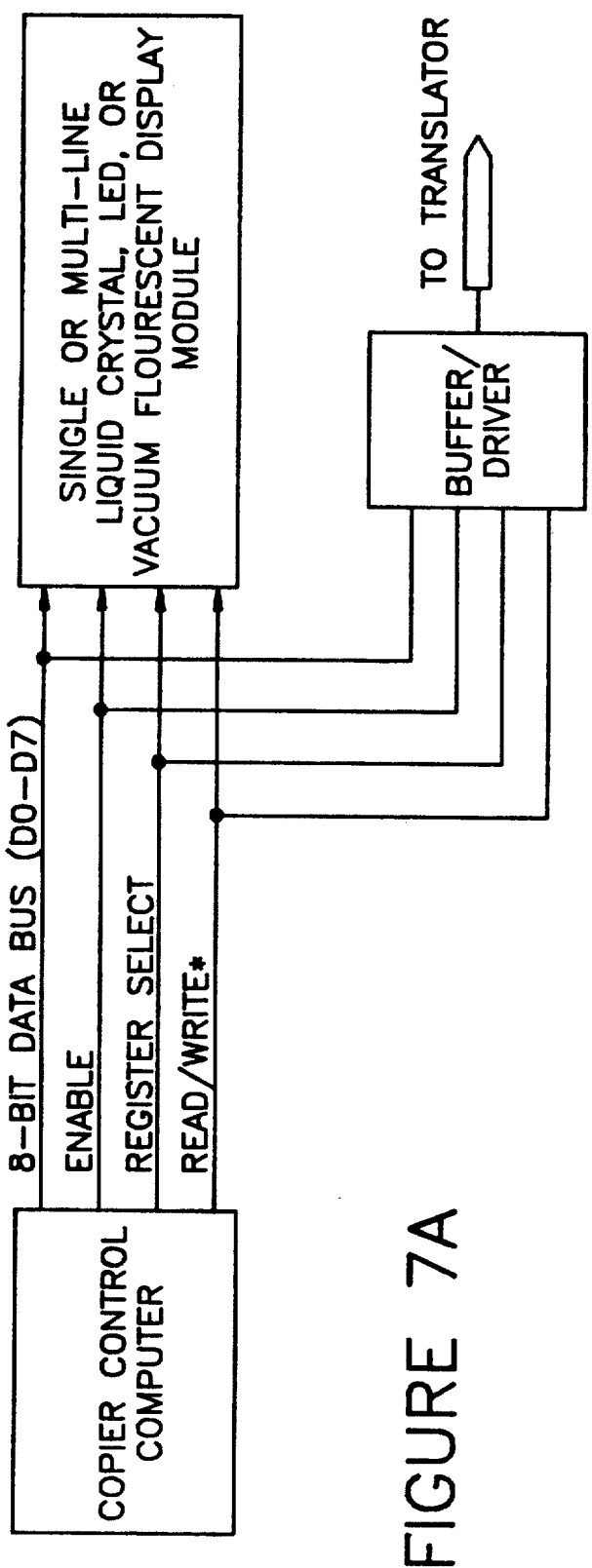
FIG. 7A is a schematic block diagram of a parallel data transmission technique from a copier control computer to the control panel display.
Figure 7B:
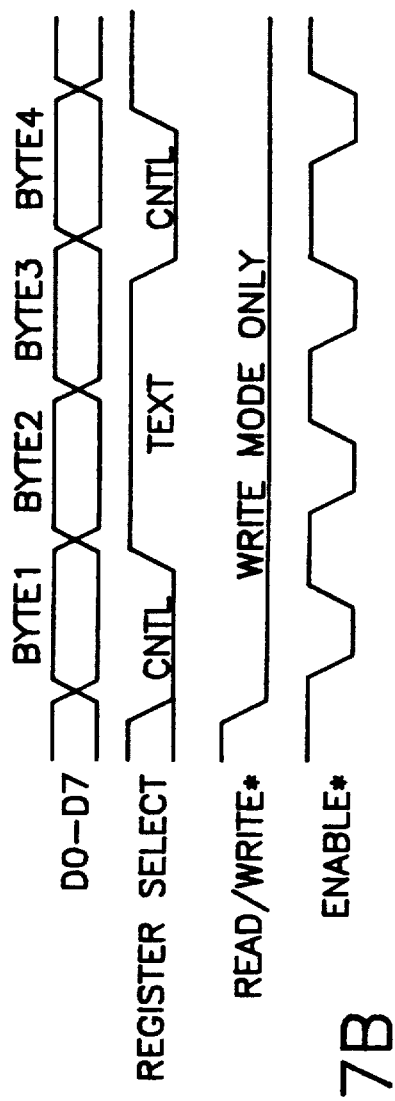
FIG. 7B is a display access timing diagram.

In a parallel transmission system, shown in FIGS. 7A and 7B, information is passed from the copier control computer 10 to the receiving display 12 synchronously as 8-bit bytes. Each byte is placed on the data bus and clocked into the receiving device via the strobe (ENABLE*).

In either case, the receiving display device 12 has some on-board intelligence (a dedicated function microcontroller) that processes the incoming data and formats it into the display output medium. This data can either be control commands or ASCII (text) characters. If it is a command, the controller in the display 12 will interpret what actions are to be taken (such as initializing the display, positioning the cursor at a specific line or address, etc.). If the data is text, the visual representation of the character will appear at the current location of the display cursor.

The architecture for the dynamic translator 6 is basically the same as for the static multiplexed data translator 6. The CPU 22, ROM 26, RAM 28, configuration 30 and UART1 38 functions remains the same. In addition, there are buffers 42, a second universal asynchronous receiver/transmitter (UART2) 38b and first-in-first-out (FIFO) memory 44. However, there is no background timer.

The dynamic translator 6 has the capability to accept either serial or parallel data from the data tap 8. Again, the CPU 22 can determine this from the configuration selection switches 30. These switches 30 are programmed to select the operating mode that the translator system will operate in, similar in principle to the translator for multiplexed data that was described earlier. For example, one switch could be used to select between serial and parallel operating mode, i.e., 1 = serial and 0 = parallel data operation.

The switches 30 are connected to the digital port 32 inputs. At power-up time the CPU 22 reads the digital port 32 to determine the operating mode that it should continue under.

If the serial mode is selected, the incoming serial data from the data tap 8 first passes through a buffer 42 to condition the signal to levels that are appropriate for the UART238b. During the initialization phase of the translator 6, the UART2 38b is internally configured by the CPU 22 with the necessary parameters to receive the incoming data. The serial data stream is then converted to parallel data for use by the CPU 22.

After each byte is assembled, UART2 38b would interrupt the CPU 22 to inform it that it has another byte of data for it. After the CPU 22 has read the data in it, the data would be stored in RAM 28 for later evaluation. Determining the end of the data stream is by inference if no additional characters are detected after a predetermined amount of time.

In the parallel mode, the incoming parallel data from the data tap 8 is 8-bit wide bytes (D 0–D 7 of FIG. 7). The parallel bus also has control signals (REGISTER SELECT and READ/WRITE) and an enable signal that is asserted when the data and control signals are valid. All of this data initially passes through a buffer 42 until the enable signal is asserted and then is automatically forwarded into a first-in-first-out (FIFO) memory 44.

Figure 9:
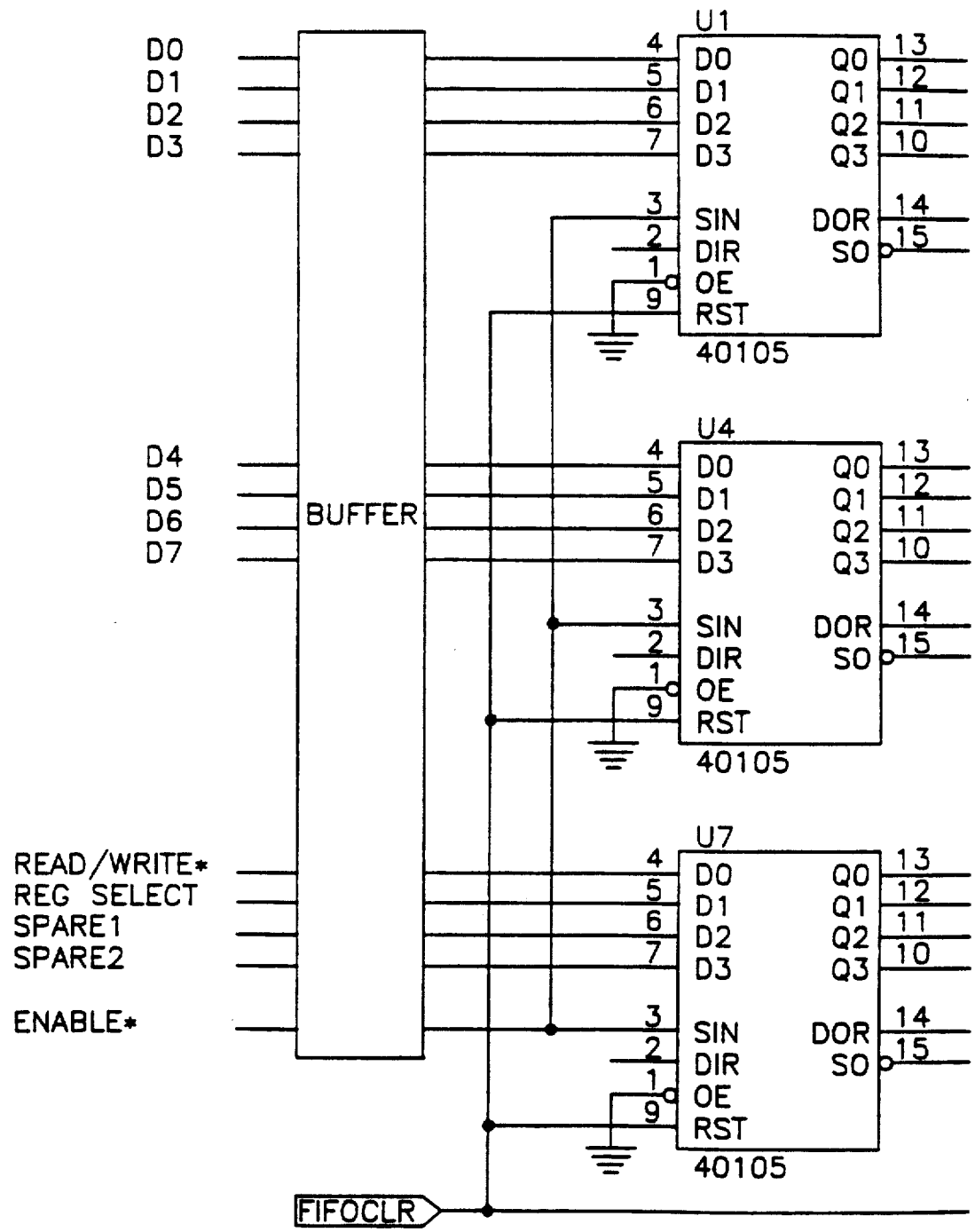
FIG. 9A is a schematic diagram of a 12×48 FIFO memory for a parallel interface translator.
FIG. 9B is a FIFO memory array timing diagram.
Figure 9:
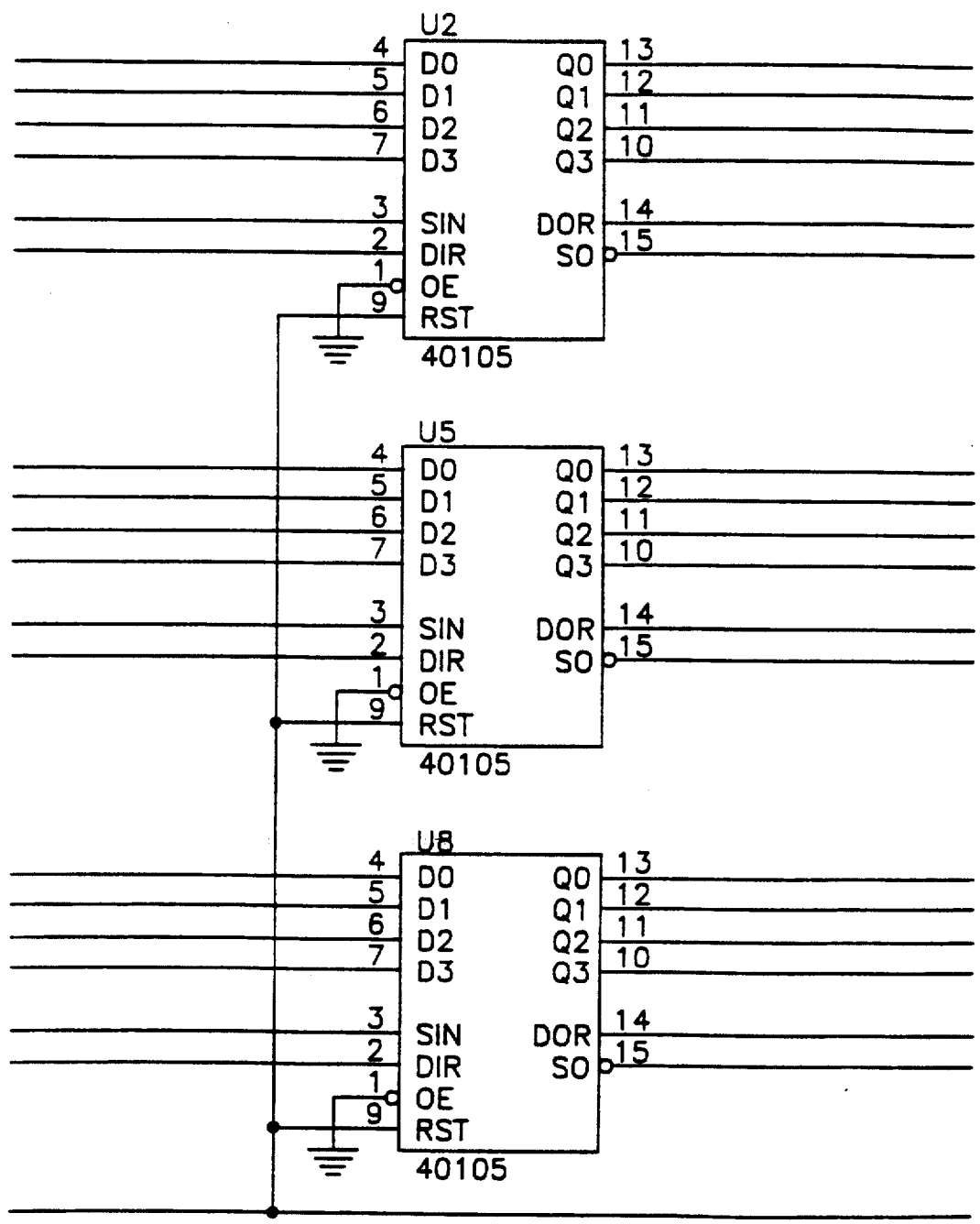
Figure 9:
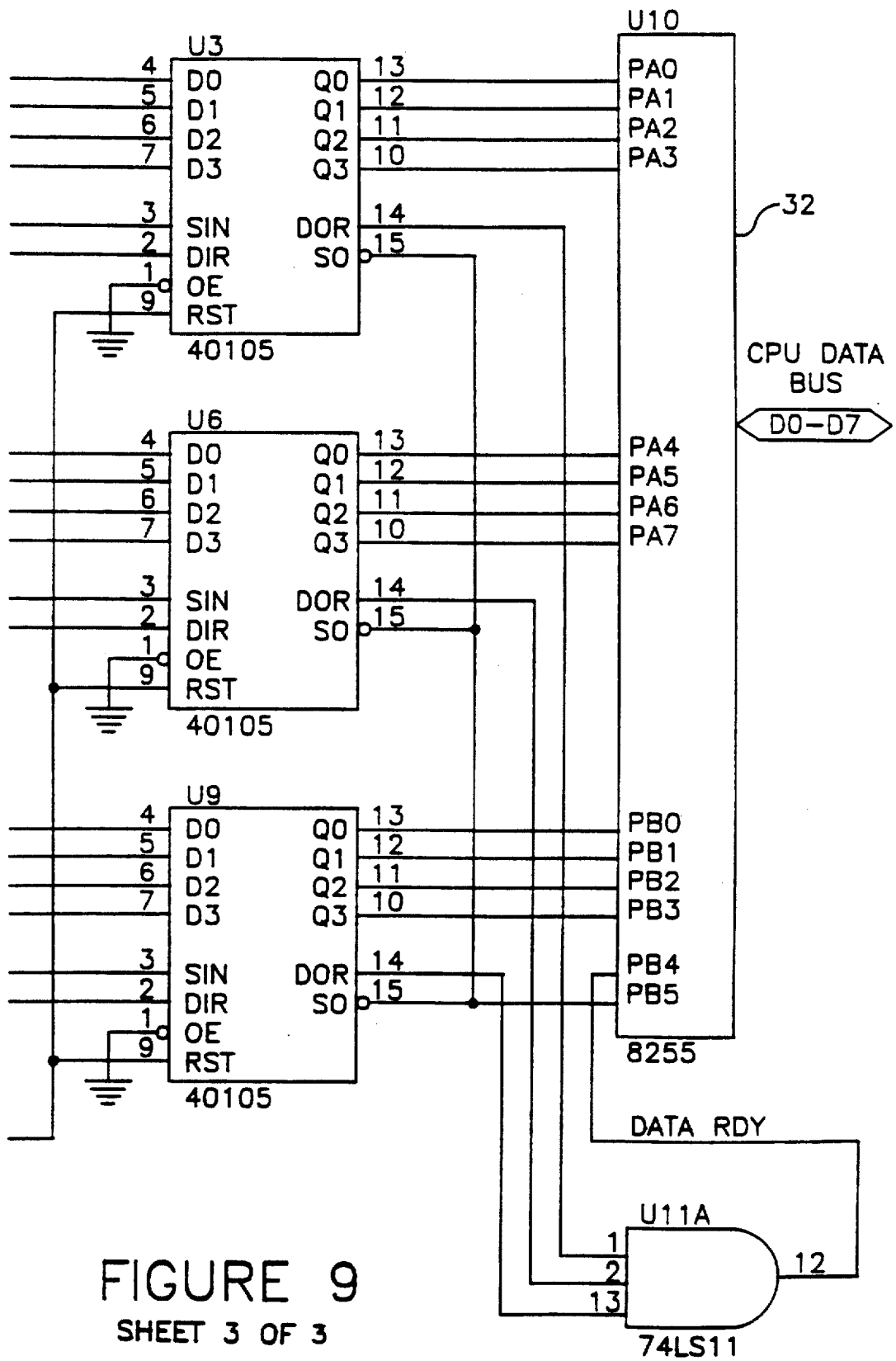
Figure 9B:
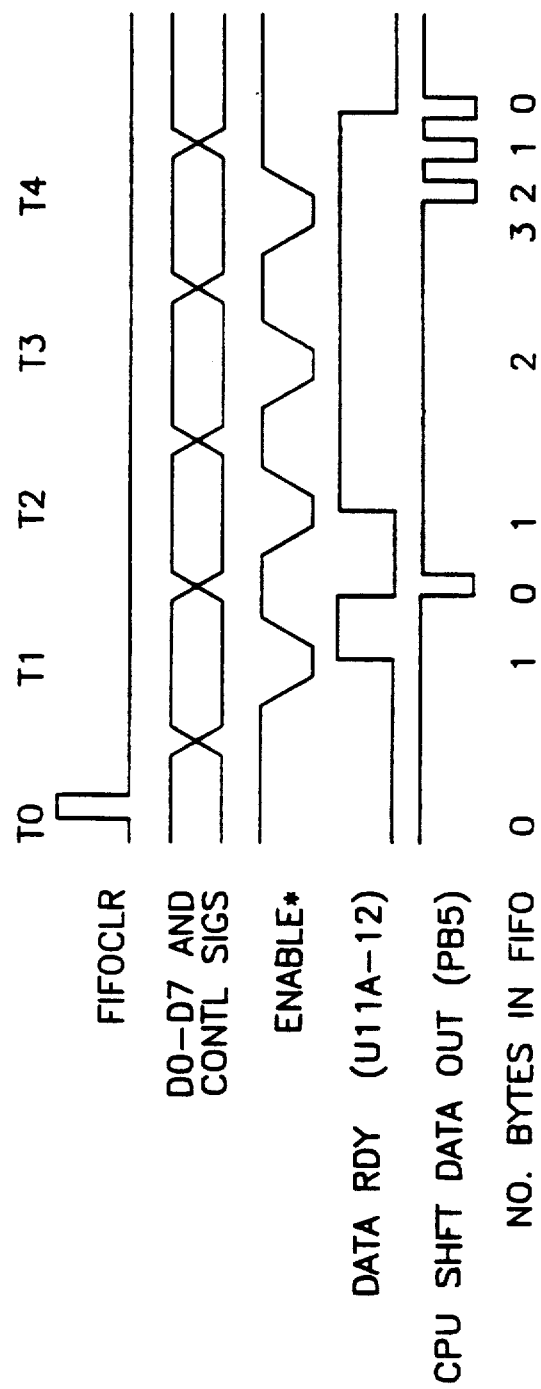

The FIFO memory 44 can be constructed as shown in FIGS. 9A and 9B. This particular memory arrangement is created from a composite of nine smaller 4×16 bit FIFO's (comprising 40105 devices) so connected in series/parallel as to form a wider and deeper 12×48 bit FIFO. These devices receive parallel input from the copier 2 into the data inputs (D 0–D 3) of devices U 1, 4 and 7. The data is clocked into this first bank by the ENABLE* clock from the copier 2. From there the data ripples to the back of the FIFO 44 (U 3, 6 and 9) in a "bucket brigade" fashion and is presented to the inputs of the digital port 32.

As soon as the first 12-bit word has propagated to the back of the FIFO 44, the DATA RDY signal is asserted by the 3-input AND gate (U11A) and is made available to the digital port 32. In this way the CPU 22 can poll the DATA RDY line to test for any data present in the FIFO 44. When the signal is asserted, the CPU 22 can read the digital port 32 to extract the data and then pulse the PB5 line of the digital port 32 to cause the next word of the FIFO 44 to propagate up. The CPU 22 can also perform a master reset of the entire FIFO array by pulsing the FIFOCLR line, such as at T 0. As demonstrated in the FIFO memory timing diagram, the FIFO 44 fills with data as it is clocked in by ENABLE* (T 1, T 2, T 3 and T 4) and is unloaded as it is clocked out by the CPU 22. Note that between T 1 and T 2 the FIFO memory 44 can absorb 48 words of data independent of the CPU 22 and can output the data to the CPU 22 independent of the copier 2. As with the serial interface method, the data is transferred to RAM 28 for buffering and evaluation.

The data stream that is passed by a dynamic copier 2 consists of discrete display commands and ASCII text characters.

The translator 6 strips the control characters and sends the ASCII text stream to the central computer 16 for evaluation and formatting. There are several other approaches to evaluating such a data stream.

For example, sending the data directly to the central computer 16, unaltered, and letting the central computer 16 evaluate or reformat the data. Also, parsing the data looking for key words and making an inference that a problem exists from the key words can be achieved. Data can then be sent (by token or text stream) to the central computer 16 for evaluation or reformatting.

The translators 6 are polled by the scanner 14 to obtain the most recent status information. At the translator location there are RS422 transmitter/receivers 50 (3486) that are wired to the scanner 14 at the central location 4. However, as stated above, the communication means for transmitting the status information from the translator 6 to the scanner 14 is not limited to hard wiring.

The scanner 14 is controlled by the central computer 16 and acts as a multiplex switcher which receives a message from the central computer 16 on which translator 6 to poll. The scanner 14 then makes cross connection to the appropriate translator 6 and passes the information to the computer 16.

The scanner/multiplexer 14 can be any one of a number of such devices and are well known in the art. One example is a six port auto switch manufactured by L TEX ELECTRONICS under the name SMART 6.

Possibilities for polling translators 6 include separate communication lines 52 for each translator 6, having the scanner 14 send a request to each unit in sequential round-robin fashion (shown in FIG. 1) or to daisy-chain the translators 6 together on a common line in a connected or unconnected ring wherein the scanner 14 would put the translator identifier of the unit being polled on the line 52.

Figure 10:
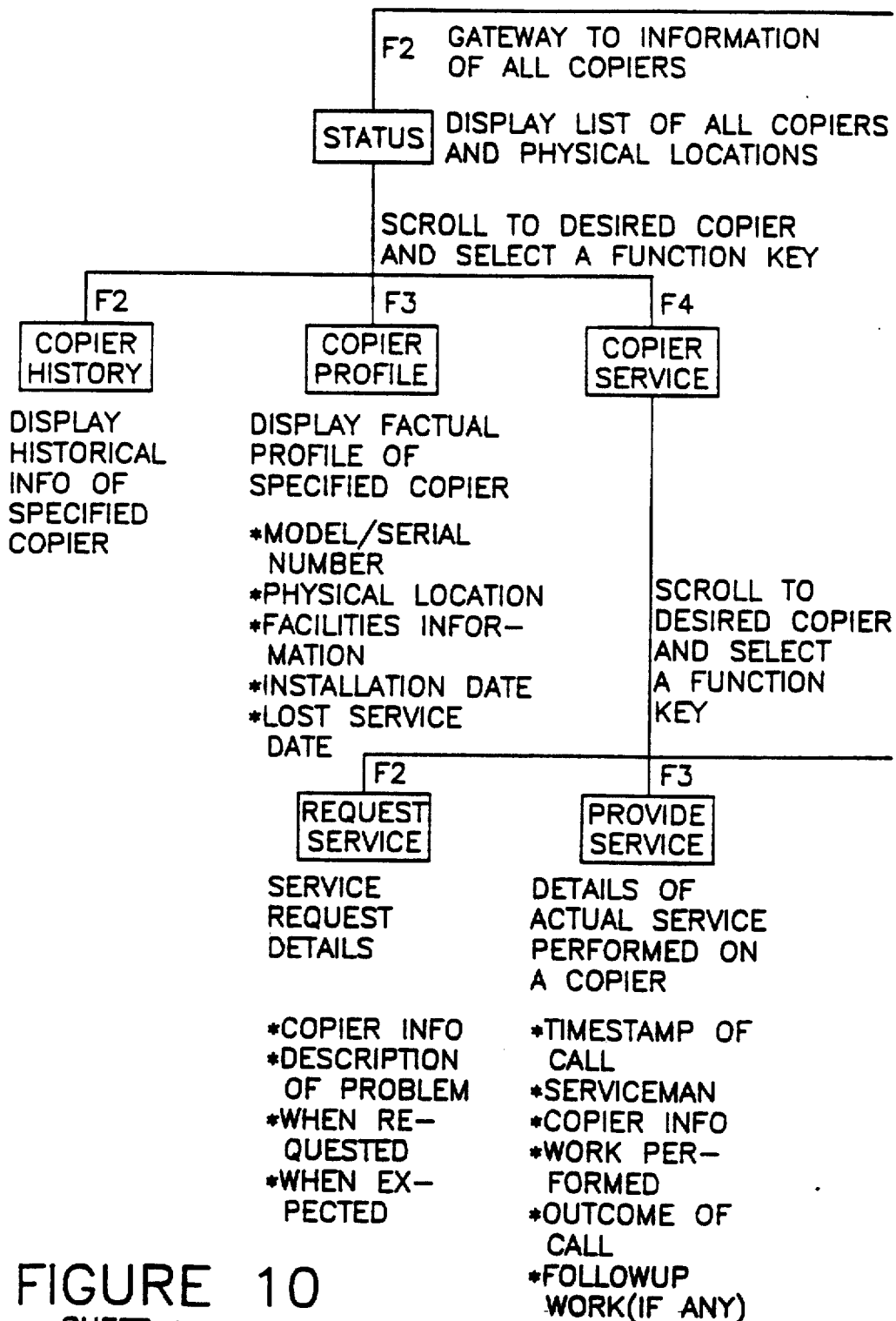
FIG. 10 is a menu selection chart for use with the central computer.
Figure 10:
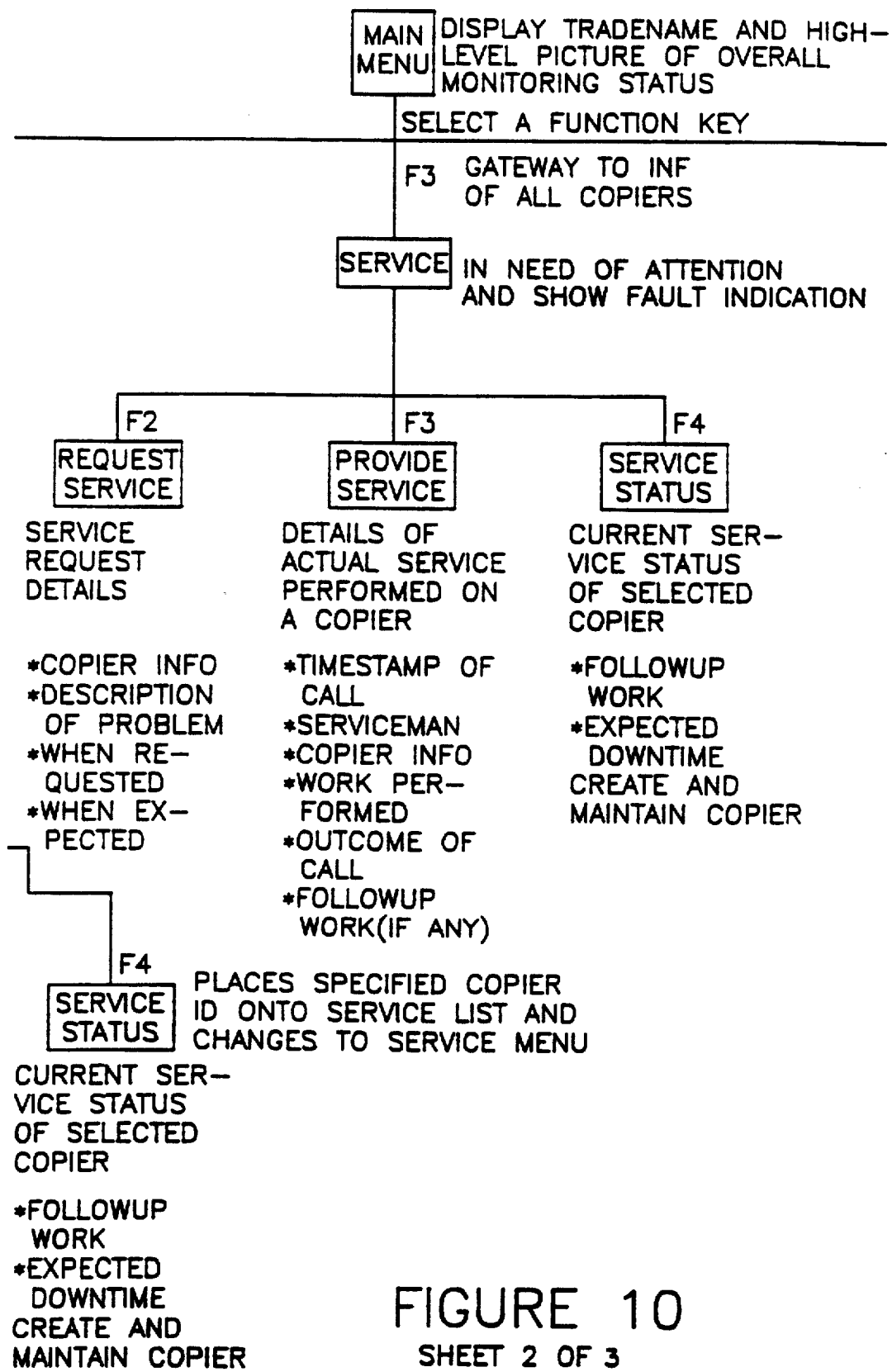
Figure 10:
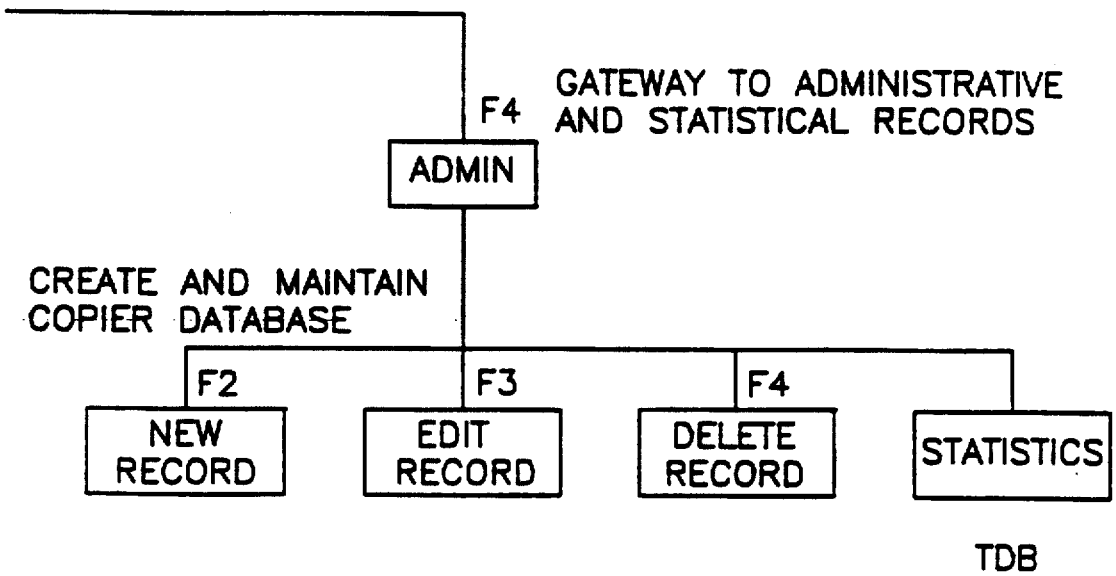

The central computer 16 can be an IBM compatiable personal computer consisting of a monitor, keyboard, CPU, floppy drive, hard disk drive, and 640K of Random Access Memory running DOS 3.3. The central computer 16 assembles the status information into various display formats. Some of the user features are displayed in the Menu Selection Tree (FIG. 10). These features enable a database of information on copiers by manufacturer, model, options, location, facilities etc. to be built. The database would then be merged with the status information to present a current representation of status of all copiers on the monitoring network. Copiers with operational problems are easily identified and service requests made and tracked in like manner.

PROPHETIC EXAMPLE

An error status signal sent from the copier controller computer 10 to the copier display 12 is intercepted by the data tap 8, comprising a Y-cable. The data is transmitted to a translator 6 by means of a data transmission cable 20. The translator 6 may have modular jacks which accept cooperating jacks on the transmission cable 20.

The translator 6 being polled for information then transmits data readable by the multiplexer/scanner 14 and stores certain data. The translator 6 then transmits data to the scanner/multiplexer 14 at the central location along line 52 by the use of line drivers/receivers 50 (RS 422). Similarly, line 52 can have modular jacks at each end which cooperate with jacks on both the translator and scanner/multiplexer 14.

The scanner/multiplexer 14 is controlled by a program in the computer 16 under DOS 3.3. As such, the scanner/multiplexer 14 may be integrated into the computer 16.

A user interface 60, such as a board relating to the various copiers being monitored and a keyboard and screen to extract other information, can be used to alert the user to the location and status of an error. This interface 60 can also be used to operate the copier remotely.

Variations of the present invention will make themselves apparent to those of ordinary skill in the art and are intended to fall within the spirit and scope of the invention, limited only by the appended claims.

We claim:

1. A system for automatically monitoring the operational status of one or more copier machines from a remote location, each copier machine having a copier control computer for determining copier status, comprising means for monitoring status information from the copier control computer, a translator associated with each copier including means to adapt status information from the specific copier machine into uniform status information for transmission to the remote location, means for transmitting information between the translator of each copier and the remote location and means to poll the translator for each copier machine, to obtain copier machine status information, from the remote location.

2. The system of claim 1 wherein the means to poll the translator of each copier machine is a scanner.

3. The system of claim 1 further comprising a central computer at the remote location to poll assemble and format the status information from the one or more copier machines.

4. The system of claim 1 further comprising a user interface at the remote location wherein a user can review copier status information on command.

5. The system of claim 1 further comprising means to vary the polling rate of the specific translators to allow a user to poll all translators at a uniform rate without specific priority to any one translator or poll a priority of one or more translators with a reduced polling rate of the remaining translators.

6. The system of claim 1 wherein the means for monitoring status information from the copier control computer comprises means for physically interfacing the copier control computer by the translator.

7. The system of claim 6 wherein the means for physically interfacing the copier control computer is a Y-cable utilizing a Y-tap placed in line with a data transmission cable of the copier between the copier control computer and a copier control panel/display on said copier.

8. The system of claim 1 wherein the translator is a device located outside the copier machine comprising a voltage level converter to convert voltage levels of the data from the copier machine to an appropriate level and a central processing unit (CPU) programmed to process the data from the copier machine and send it to the central location by said means for transmitting information.

9. The system of claim 1 wherein the means for transmitting information between the translator for each copier and the remote location is taken from the group comprising telephone lines, hardwiring, optic fibers and RF transmission/reception.

* * * * *

UNITED STATES PATENT AND TRADEMARK OFFICE
CERTIFICATE OF CORRECTION

PATENT NO. : 5,084,875            Page 1 of 2

DATED : January 28, 1992

INVENTOR(S) : Joseph Weinberger, Gary Bricault and James Laird

It is certified that error appears in the above-identified patent and that said Letters Patent is hereby corrected as shown below:

Title page, item [75],

In the list of inventors, the address "13 Buernset La." should read --13 Guernsey La.--.

Figure 8:
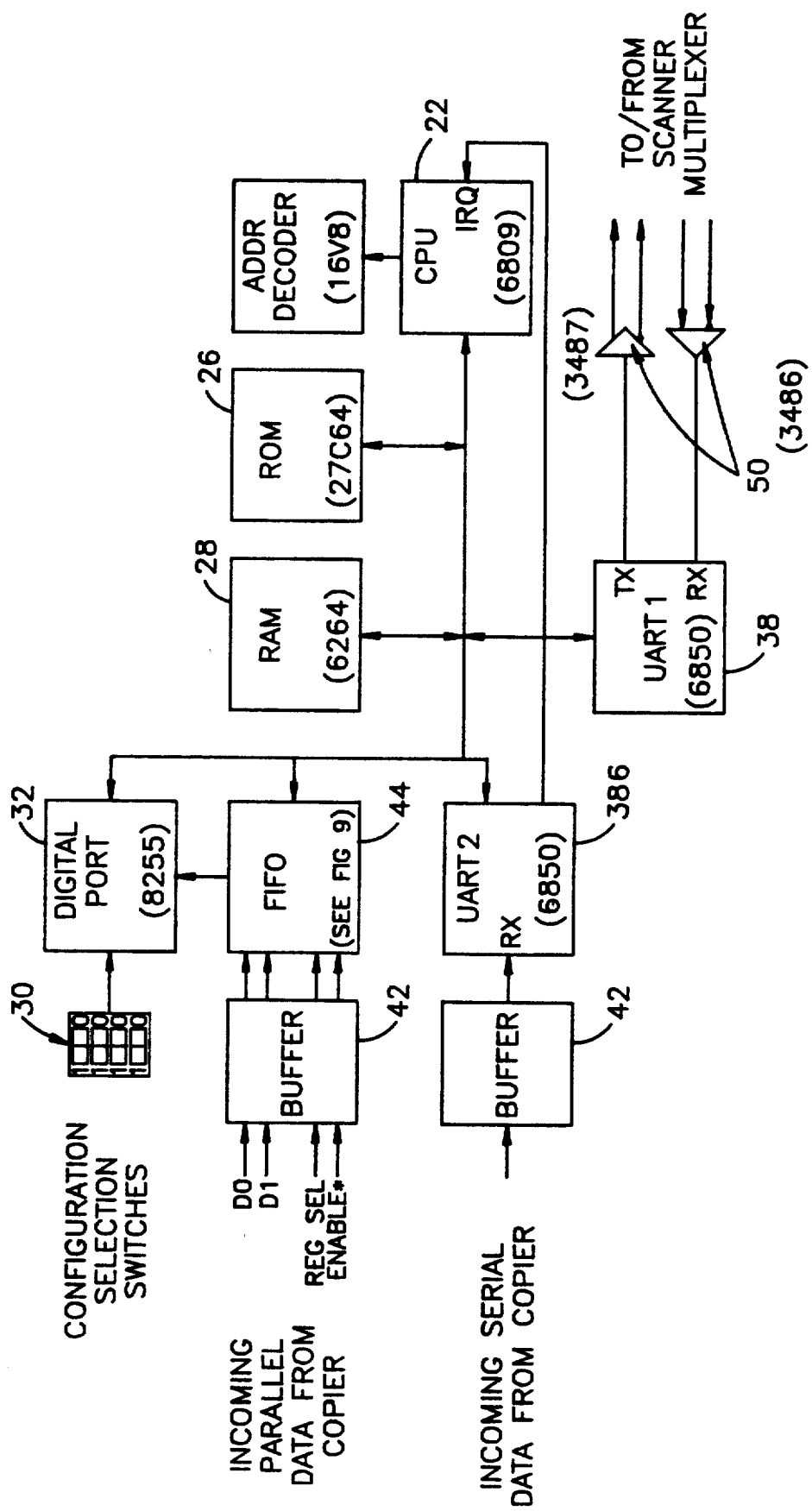
FIG. 8 is a schematic block diagram of a serial/parallel data version translator for use with the present invention.

In FIGURE 8, on Sheet 9 of 16 of the drawings, at the lower portion just left of center, the reference character "386" should read --38b--.

Drawings:

On Sheet 10 of 16 of the drawings, reading "FIGURE 9", the caption should read --FIGURE 9A SHEET 1 OF 3--.

On Sheet 11 of 16 of the drawings, also reading "FIGURE 9", the caption should read --FIGURE 9A SHEET 2 OF 3--.

On Sheet 12 of 16 of the drawings, reading "FIGURE 9 SHEET 3 OF 3", the caption should read --FIGURE 9A SHEET 3 OF 3--.

In FIGURE 10 SHEET 1 OF 3, on Sheet 14 of 16 of the drawings, at the top of the sheet, "MENY" should read --MENU--, and at the middle of the same sheet "LOST" should read --LAST--.

In FIGURE 10 SHEET 2 OF 3, on Sheet 15 of 16 of the drawings, toward the top of the sheet after "F3", the phrase "GATEWAY TO INF OF ALL COPIERS" should read --GATEWAY TO COPIER SERVICE RECORDS--; just below that, adjacent the box containing the word "SERVICE", the text "IN NEED OF ATTENTION AND SHOW FAULT INDICATION" should be preceded by --DISPLAY LIST OF ALL COPIERS--; just below that, where the vertical line branches into a horizontal line, on the horizontal line there should be text reading --SCROLL TO DESIRED COPIERS AND SELECT A FUNCTION KEY--.

UNITED STATES PATENT AND TRADEMARK OFFICE
CERTIFICATE OF CORRECTION

PATENT NO. : 5,084,875
DATED : January 28, 1992
INVENTOR(S) : Joseph Weinberger, Gary Bricault and James Laird It is certified that error appears in the above-identified patent and that said Letters Patent is hereby corrected as shown below:

On Sheet 16 of 16 of the drawings, below the caption "FIGURE 10" should be the designation --SHEET 3 OF 3--.

In column 2, line 15, "FIG. 4" should read --FIG. 4A--.

In column 5, line 24, "FIG. 4" should read --FIG. 4B--.

In column 7, line 31, the numeral "48" should not be bold.

Signed and Sealed this

Eleventh Day of January, 1994

Attest:

BRUCE LEHMAN

*Attesting Officer*     *Commissioner of Patents and Trademarks*